United States Patent
Suzuki et al.

(10) Patent No.: US 6,290,896 B1
(45) Date of Patent: Sep. 18, 2001

(54) PREPARATION PROCESS OF THE FORMED PRODUCT OF L-LACTIC ACID BASE POLYMER

(75) Inventors: Kazuhiko Suzuki; Takayuki Watanabe; Yasuhiro Kitahara; Masanobu Ajioka, all of Kanagawa-Ken (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 08/443,672

(22) Filed: May 18, 1995

Related U.S. Application Data

(63) Continuation of application No. 08/105,671, filed on Aug. 13, 1993, now abandoned.

(30) Foreign Application Priority Data

Aug. 24, 1992 (JP) .................................................. 4-223864

(51) Int. Cl.[7] .................................................. B29C 51/10
(52) U.S. Cl. .......................... 264/544; 264/547; 264/553; 264/554
(58) Field of Search .................................. 264/553, 554, 264/544, 547, 551

(56) References Cited

U.S. PATENT DOCUMENTS

| | | | |
|---|---|---|---|
| 4,118,454 | * | 10/1978 | Miki et al. .............................. 264/93 |
| 5,108,530 | * | 4/1992 | Niebling, Jr. et al. ............... 156/245 |
| 5,180,765 | * | 1/1993 | Sinclair ................................. 524/306 |
| 5,213,754 | * | 5/1993 | Kawaguchi et al. ................. 264/544 |
| 5,424,346 | * | 6/1995 | Sinclair ................................. 524/108 |

FOREIGN PATENT DOCUMENTS

| | | |
|---|---|---|
| 107591 | 5/1984 | (EP) . |
| 507554 | 10/1992 | (EP) . |
| 92/04393 | 3/1992 | (WO) . |

\* cited by examiner

*Primary Examiner*—Jan H. Silbaugh
(74) *Attorney, Agent, or Firm*—Burns, Doane, Swecker & Mathis, L.L.P.

(57) ABSTRACT

A formed product which has a thickness of 0.1~2 mm and a haze of 5%/2 mm or less and is degraded with ease in the natural environment is obtained by holding a transparent L-lactic acid base polymer sheet having an L-lactic acid proportion of 75% or more and a thickness of 0.2~2 mm under conditions where:

(1) a holding temperature is in the range of 55~90° C., (2) a holding time $m_1$ (min) satisfies the formula:

$$\log_{10} m_1 < -0.083\, T_1 + 7.66,$$

forming said sheet by adhering to the internal surface of a mold through vacuum suction, compressed air pressure or vacuum/air pressure under a condition where:

(3) a mold temperature $T_2$ is set in the range of from the glass transition temperature Tg of the L-lactic acid base polymer to the holding temperature $T_1$, and taking out the formed product from the mold after reducing an internal temperature of the mold to less than Tg.

2 Claims, No Drawings

PREPARATION PROCESS OF THE FORMED PRODUCT OF L-LACTIC ACID BASE POLYMER

This application is a continuation of application Ser. No. 08/105,671, filed Aug. 13, 1993, now abandoned.

BACKGROUND OF THE INVENTION AND RELATED ART

1. Field of the Invention

The present invention relates to a formed product of an L-lactic acid base polymer and the preparation process of the product. More particularly, the invention relates to a formed product of an L-lactic acid base polymer which has good transparency and can degrade after use in natural environment.

2. Related Art of the Invention

Plastic materials for forming products prepared from plastic sheets are polystyrene, polyvinyl chloride, polypropylene and polyethylene terephthalate. Although some of the formed products prepared from these plastics are excellent in transparency, disposal of the products increases the amount of refuse and they remain semipermanently when buried under the ground, since they almost do not degrade under the natural environment. Disposal of the formed products in the ocean causes aesthetic damage or destruction of the living environment of marine organisms.

On the other hand, polylactic acid and copolymers of lactic acid and hydroxycarboxylic acids other than lactic acid (generic name of the polylactic acid and the copolymers will hereinafter be referred to simply as a lactic acid base polymer) have been developed for thermoplastic and biodegradable polymers. These polymers can be completely biodegraded within a few months to an year in an animal body. When the polymers are placed in most soil or sea water, they start to decompose in a few weeks in a moist environment and disappear within a year to several years. Further, final degradation products of the polymers are lactic acid, carbon dioxide and water which are nontoxic to human body.

Polylactic acid in the lactic acid base polymer is usually prepared from a cyclic dimer of lactic acid which is called lactide, and U.S. Pat. Nos. 1,995,970, 2,362,511, and 2,683,136 have disclosed a polymerization process of lactide. U.S. Pat. Nos. 3,636,956 and 3,797,499 have disclosed a process for copolymerizing lactic acid and glycolic acid. In the copolymerization of lactic acid and the other hydroxy carboxylic acids, lactide and a cyclic ester intermediate, for example glycolide, i.e., a dimer of glycolic acid, are used for polymerization.

Lactic acid which is a raw material of the lactic acid base polymer is prepared by fermentation or chemical syntheses. Recently, L-lactic acid has been cheaply produced in a large amount by fermentation in particular. The polymer obtained has the characteristic of high stiffness. Consequently, the polymer having a high content of L-lactic acid is now under development for use.

Particularly, formed products obtained by preparing a sheet from a polymer having a high content of L-lactic acid and subjecting the sheet thus prepared to vacuum forming or air-pressure forming are expected to have a bright future because forming can be conducted with ease and many kinds of desired shapes can be formed. However, the formed products prepared from the polymer having a high content of L-lactic acid through the above forming method are opaque and are restricted in the fields of use. The opacity is particularly enhanced when the L-lactic acid proportion is 75% or more in the lactic acid base polymer. The phenomenon is thought to be inhibition of transparency by the crystallized lactic component because poly-L-lactic acid is very liable to crystallize in the polymer.

SUMMARY OF THE INVENTION

An object of the invention is to provide a formed product which is primarily composed of L-lactic acid base polymer and is excellent in transparency.

One aspect of the invention is a formed product of an L-lactic acid base polymer, the formed product of which is obtained by vacuum forming or pressure air forming, said polymer having an L-lactic acid proportion of 75% or more and a haze of 5%/2 mm or less.

Another aspect of the invention is a process for forming an L-lactic base polymer comprising the steps of holding a transparent L-lactic acid polymer sheet under conditions wherein ① a holding temperature $T_1$ is in the range of 55~90° C., ② a holding time $m_1$ (min) satisfies the formula (1):

$$\log_{10} m_1 < -0.083 T_1 + 7.66 \qquad (1),$$

the step of forming said polymer sheet by adhering to the internal surface of a mold through vacuum suction or compressed air pressure under a condition wherein ③ a mold temperature $T_2$ is in the range of from the glass transition temperature Tg of the L-lactic acid base polymer to the holding temperature $T_1$ and the step of taking out a formed product having a thickness of 0.1~2 mm from the mold after reducing the internal temperature of the mold to less than Tg.

The formed product of the L-lactic acid base polymer in the invention has excellent transparency, so that one can clearly examine the conditions of contents accommodated in the formed product, and thus can be suitably used for food trays and beverage cups.

Further, when these trays and cups are buried in the ground as waste or abandoned in rivers and sea after use, they can be degraded into nonhazardous water and carbon dioxide within a relatively short period in the natural environment like natural products such as paper and wood.

Thus the invention has been completed.

DETAILED DESCRIPTION OF PREFERRED EMBODIMENTS

The L-lactic acid base polymer used for the invention is a polymer having 75% or more of L-lactic acid ratio in the polymer. Lactic acid used for a raw material of the L-lactic acid base polymer is L-lactic acid, D-lactic acid, a mixture thereof or lactide which is a cyclic dimer of the above L-lactic acid, D-lactic acid or a mixture thereof.

Hydroxycarboxylic acids which can be copolymerized with lactic acid include a hydroxycarboxylic acid such as glycolic acid, 3-hydroxybutyric acid, 4-hydroxybutyric acid, 4-hydroxyvaleric acid, 5-hydroxyvaleric acid, 6-hydroxycaproic acid and a cyclic ester intermediate of a hydroxycarboxylic acid such as glycolide which is a dimer of glycolic acid and ε-caprolactone which is a cyclic ester of 6-hydroxy caproic acid.

The L-lactic acid base polymer can be directly prepared by dehydrating polycondensation of L-lactic acid or dehydrating copolycondensation of L-lactic acid and the other hydroxycarboxylic acids or can be prepared by ring opening polymerization of lactide or a cyclic ester intermediate of a hydroxycarboxylic acid, for example, glycolide which is a dimer of glycolic acid and ε-caprolactone which is a cyclic ester of 6-hydroxy caproic acid. Any of these compounds can be used in the invention.

When the polymers are directly prepared by dehydrating polycondensation, L-lactic acid or L-lactic acid and the other hydroxycarboxylic acids raw materials are subjected to azeotropically dehydrating condensation in the presence of an organic solvent, a phenyl ether base solvent in particular. A high molecular weight poly-L-lactic acid base polymer obtained by the method in which water is removed from the azeotropically distilled solvent and the resulting substantially anhydrous solvent is returned to the reaction system has a mechnical strength particularly suitable for the presention invention.

Molecular weight of the lactic acid base polymer is 30,000 or more. Polymers having high molecular weight can be used so long as polymers can be formed. Polymers having a molecular weight of less than 30,000 provide a formed product having low-mechanical strength and is unsuitable for practical use. Polymers having a molecular weight of 1,000,000 or more can also be used for preparing the formed product of the invention by modifying the processing method.

A composition which can used in the invention is prepared by mixing and kneading the above L-lactic acid base polymer with commonly known plasticizers and various other modifiers. In such a case, an L-lactic acid proportion of 75% or more must be maintained in the composition. The L-lactic acid polymer or its composition can be used in the form of pellets, bars and powder and can be prepared by any known kneading techniques.

Next, the preparation process of the formed product by using the L-lactic acid base polymer of the invention will be illustrated in detail.

The formed product of the invention which consists of L-lactic acid base polymer and has excellent transparency is prepared by vacuum forming or pressure air forming a sheet of L-lactic acid base polymer having an L-lactic acid proportion of 75% or more. The sheet of L-lactic acid base polymer is transparent and has a thickness of 0.2~2 mm. When the sheet is translucent or opaque or the thickness of the sheet is outside the range of 0.2~2 mm, the formed product of the invention is difficult to obtain.

The transparent sheet having a thickness of 0.2~2 mm is prepared from the L-lactic acid polymer or the composition of the same by extrusion forming method or compression molding. In the extrusion forming, the raw material is melt-kneaded in an extruder at 180~300° C., preferably at 200~250° C. and delivered through a T-die mounted on the extruder head to obtain a sheet. The sheet is cooled to 10~50° C., preferably 20~30° C. In the compression molding method, a mold is heated to 180~260° C., the raw material is charged into the mold and pressed, the mold is rapidly cooled to 10~50° C., preferably 20~30° C., and a sheet thus formed is taken out of the mold.

The sheet obtained above has excellent transparency and is successively used for preparing the formed product of the invention.

The formed product of the invention can be prepared by the following steps.

1. The transparent sheet of the L-lactic acid base polymer is held while heating on both sides in a temperature range of 55~90° C. for a holding time $m_1$ (min) which satisfies the formula (1):

$$\log_{10} m_1 < -0.083 T_1 + 7.66 \tag{1}$$

The holding temperature can be continuously varied. In this case, the holding time can be obtained by integrating the formula (1).

2. The above heated sheet is formed with a vacuum forming machine or a pressure air forming machine. Mold temperature is set above Tg of the L-lactic acid base polymer, for example, at 50~70° C. Forming is carried out under pressure of 100 torr or less for vacuum forming and 1.1~4.0 kg/cm² in pressure for air forming. Thereafter the mold temperature is lowered to less than Tg, for example, 20° C. and a formed product is taken out of the mold.

Alternatively, the sheet can also be formed by such method of vacuum-pressure air forming that the sheet is sucked under vacuum in the first stage and then air-pressurized to adhere into the mold.

Any vacuum-pressure air forming machine can be used for the invention so long as the machine has the ability to adhere the polymer sheet into the mold. Both vacuum-suction and air-pressure type machines can be used. Exemplary forming machines are, for example, a vacuum-pressure air forming machine model 1010-PWB (Manufactured by Fuse Vacuum Co.; Vacuum forming and pressure forming can be conducted) and an air pressure-vacuum forming machine model FK-0531-5 (Manufactured by Asano Laboratory Co.).

The present invention is suited for preparing a formed product having a thickness of 0.1~2.0 mm. The formed product has a haze of 5%/2.0 mm or less. The invention can form from large sized to small sized products of the types that have been prepared from general purpose polystyrene resin by vacuum forming or pressure forming. Formed products can be used for various applications such as daily necessaries and miscellaneous goods.

The invention will hereinafter be illustrated in detail by way of examples. In these examples, part means part by weight

EXAMPLES

The present invention will hereinafter be illustrated in detail by way of examples and comparative examples.

In the examples and comparative examples, a weight average molecular weight of the polymer was measured by gel permeation chromatography under the following conditions using polystyrene as a reference.

Equipment: Shimadzu LC-10 AD
Detector: Shimadzu RID-6A
Column: Hitachi Kasei GL-S350DT-5, GL-S370DT-5
Solvent: Chloroform
Concentration: 1%
Amount of sample: 20 µl
Flow rate: 1.0 ml/min Preparation Example 1

To a thick-walled cylindrical stainless steel polymerizer equipped with a stirrer, 100 parts of L-lactide, 0.01 parts of stannous octoate and 0.03 parts of dodecyl alcohol were charged. The mixture was deaerated for 2 hours under vacuum and heated in a nitrogen atmosphere with stirring at 200° C. for 3 hours. Then the polymerizer was gradually deaerated through a gas outlet tube and glass receiver with a vacuum pump to a reduced pressure of 3 mmHg while maintaining the same temperature. After reacting for an hour from the start of deaeration, distillation of monomer and low molecular weight volatiles were ceased. The interior of the polymerizer was replaced by nitrogen. Poly-L-lactic acid obtained was discharged from the bottom of the polymerizer in the form of a strand and cut into pellets (polylactic acid base polymer A). The pelletized polymer A had an average molecular weight of 100,000 and Tg of 59° C.

Preparation Example 2

In a 100 L reaction vessel equipped with a Dean-Stark trap, 10.0 kg of 90% L-lactic acid was heated with stirring for 3 hours at 150° C./50 mmHg while distilling off water. And then, 6.2 g of tin powder was added and the reaction mixture was further stirred for 2 hours at 150° C./30 mmHg to obtain an oligomer. To the oligomer, 28.8 g tin powder and 21.1 kg of diphenyl ether were added and an azeotropic dehydration reaction was carried out at 150° C./30 mmHg. Water and the solvent which were distilled out were separated in a water separator and the solvent alone was returned to the reaction vessel. After reacting for 2 hours, the returning solvent was changed to pass through a column packed with 4.6 kg of molecular sieve 3A in order to dry the solvent prior to enter into the reactor, and the reaction was further carried out for 40 hours at 150° C./30 mmHg to obtain a solution of polylactic acid having an average molecular weight of 110,000.

To the solution, 44 kg of dehydrated diphenyl ether was added and cooled to 40° C. Precipitated crystals were filtered, washed 3 times with 10 kg of n-hexane and dried at 60° C./50 mmHg. To the crystals obtained, 12 kg of 0.5 N hydrochloric acid and 12.0 kg of ethanol were added, stirred for an hour at 35° C. and filtered. Precipitated powder was filtered and dried at 60° C./50 mmHg to obtain 6.1 kg (85% yield) of polylactic acid powder. Pellets of L-lactic acid polymer were prepared by melting the powder in an extruder (polylactic acid base polymer B). The polymer B had an average molecular weight of 110,000 and Tg of 59° C.

Preparation Example 3

The same procedures as described in Preparation Example 2 were carried out except that 100 parts of L-lactic acid were replaced by 100 parts of DL-lactic acid and pellets of DL-lactic acid were obtained (polylactic acid base polymer C). The pellets of DL-lactic acid polymer C thus obtained had an average molecular weight of 110,000 and Tg of 50° C.

Preparation Example 4

The same procedures as described in Preparation Example 2 were carried out except that 100 parts of L-lactic acid were replaced by 80 parts of L-lactic acid and 20 parts of glycolic acid as a hydroxycarboxylic acid component to obtain pellets of a copolymer of lactic acid and hydroxycarboxylic acid (polylactic acid base polymer D). The copolymer D had an average molecular weight of 100,000 and Tg of 49° C.

Hereinafter, it will be illustrated on the sheet prepared from the lactic acid polymers obtained in Preparation Examples 1~4, preparation method of the formed product from the sheet and properties of the formed product.

In these examples, haze and degradation in soil were measured by the following methods.

Haze

Haze Meter (Manufactured by Tokyo Electro-color Co.) was used. Measured values were converted to a haze on 2 mm thickness.

Degradation in Soil

A test piece of the formed product having dimensions of 5×5 cm was buried in a soil at 35° C. under moisture content of 30%. After the test, change of appearance and weight loss were examined.

Example 1

A mold was mounted on a compression molding machine and heated to 200° C. L-lactic acid base polymer A obtained in Preparation Example 1 was charged into the hot mold, compression molded and cooled by blowing air having a temperature of 20° C. to obtain a transparent sheet having dimensions of 500 mm×500 mm and a thickness of 0.7 mm. The sheet was softened by hot-holding on a vacuum-pressure air forming machine 1010-PWB (Manufactured by Fuse Vacuum Co.) at a holding temperature $T_1$ of 85° C. which is in the range of 55~90° C. and a holding time $m_1$ of 1.5 minutes which is smaller than the value in the formula (1). Thereafter the sheet was drawn under reduced pressure of 50 torr to adhere into an elliptic mold which had the major axis of 146 mm minor axis of 100 mm and depth of 30 mm and was maintained at 60° C. The formed product thus vacuum-formed was cooled to 20° C. which is lower than the Tg and taken out of the mold. The formed product had a thickness of 0.6~0.63 mm.

Results are illustrated in Table 1.

Example 2

A transparent sheet having a thickness of 0.7 mm and dimensions of 500 mm×500 mm was prepared from L-lactic acid base polymer B obtained in Preparation Example 2. The sheet was mounted on the same vacuum-pressure air forming machine as used in Example 1 and softened by hot-holding at a holding temperature $T_1$ of 80° C. which is in the range of 55~90° C. and a holding time $m_1$ of 1.5 minutes which is smaller than the value in the formula (1). The softened sheet was vacuum drawn and adhered into an elliptic female mold which had the major axis of 146 mm, minor axis of 100 mm and depth of 30 mm and was maintained at 60° C. After sealing the female mold with a male mold, compressed air having a pressure of 1.3 kg/cm² was charged from the side of the male mold to complete vacuum-pressure air forming. The molds were successively cooled to 20° C. which is lower than the Tg and the formed product was taken out of the molds. The formed product had a thickness of 0.60~0.63 mm.

The results are illustrated in Table 1.

Example 3

A transparent sheet having a thickness of 0.7 mm and dimensions of 500 mm×500 mm was prepared from a mixture composed of 50 parts of L-lactic acid base polymer B and 50 parts of L-lactic acid base polymer C. The sheet was mounted on the same vacuum-pressure air forming machine as used in Example 1 and softened by hot-holding at a holding temperature $T_1$ of 80° C. which is in the range of 55~90° C. and a holding time $m_1$ of 4 minutes which is smaller than the value in the formula (1)

Successively, vacuum forming w as carried out by the same procedures as described in Example 1. The mold was cooled and the formed product was taken out of the mold. The formed product had a thickness of 1.5~1.6 mm.

Results are illustrated in Table 1.

Example 4

An elliptically formed product was prepared by carrying out the same vacuum forming as described in Example 1 except that pellets obtained from a mixture of 80 parts of L-lactic acid base polymer B and 20 parts of L-lactic acid base polymer D were used. The formed product had a thickness of 0.60~0.63 mm.

The results are illustrated in Table 1.

Comparative Example 1

An elliptically formed product was prepared by vacuum forming from the transparent sheet obtain ed in Example 2. The same procedures as described in Example 1 were carried out except that the sheet was softened by hot-holding at a holding temperature of 100° C. which is over the range of 55~90° C. and a holding time of 1.5 minutes. The formed product had a thickness of 0.60~0.63 mm, was whitened in appearance, and had poor transparency.

The results are illustrated in Table 1.

Comparative Example 2

A formed product was prepared by carrying out the same procedures of vacuum forming as described in Example 1 except that the temperature of the elliptic mold was set at 20° C. which is under the Tg. The formed product had a thickness of 0.60~0.63 mm, was poor in balance of thickness and shape of corner portions, and thus had inferior forming characteristics.

The results are illustrated in Table 1.

Comparative Example 3

A sheet was prepared by carrying out the same procedures as described in Example 1 except that high-impact polystyrene (HI polystyrene) was used in place of L-lactic acid base polymer A in Example 1. Successively, the sheet was heated at a holding temperature of 85° C. and a holding time of 1.5 minutes, and caused shortness of softening. The sheet was hence heated at a holding temperature of 150° C. and a holding time of 1.5 minutes and vacuum formed by the same procedures as Example 1 to obtained a formed product. The elliptically formed product had a thickness of 0.60~0.65 mm. The formed product of Comparative Example 3 had almost no deterioration in soil.

The results are illustrated in Table 1.

TABLE 1

|  | Example 1 | Example 2 | Example 3 | Example 4 | Comp. Example 1 | Comp. Example 2 | Comp. Example 3 |
|---|---|---|---|---|---|---|---|
| Polymer composition (wt %) | A 100 — | B 100 — | B 50 C 50 | B 80 D 20 | A 100 — | A 100 — | High-Impact Polystyrene |
| L-lactic acid proportion | 100 | 100 | 75 | 90 | 100 | 100 |  |
| Forming ability | good | good | good | good | good | irregular thickness | good |
| Transparency | good | good | good | good | whitened | good | translucent |
| Haze (%) | 4.2 | 4.5 | 3.5 | 3.3 | 15 | 4.2 | 20 |
| Degradation (3 month) Appearance |  |  | collapse by external force |  |  |  | no change |
| Weight loss (%) | 12 | 12 | 17 | 20 | 12 | 12 | 0 |

What we claim is:

1. A process for forming a molded product from a sheet of poly-L-lactic acid by vacuum forming, pressure forming or vacuum-pressure air forming, comprising the steps of- (a) holding a poly-L-lactic acid transparent sheet at holding temperature $T_1$ for $m_1$ minutes, wherein $T_1$ is in the range of 55–90° C. and $m_1$ satisfies the formula:

$$\log_{10} m_1 < -0.083\, T_1 + 7.66$$

(b) adhering the sheet to an internal surface of a mold through vacuum suction, compressed air pressure or vacuum/air pressure at mold temperature $T_2$ which is in the range of from the glass transition temperature Tg of the poly-L-lactic acid to $T_1$, and (c) removing a molded product having a haze of 5%/2 mm or less from the mold after reducing an internal temperature of the mold to less than said temperature Tg.

2. The process for forming a formed product of claim 1 wherein the poly-L-lactic acid transparent sheet has a thickness of 0.2 mm to 2 mm and the formed product having a haze of 5%/2 mm or less has a thickness of 0.1 mm to 2 mm.

* * * * *